(12) United States Patent
Smith et al.

(10) Patent No.: US 11,037,356 B2
(45) Date of Patent: Jun. 15, 2021

(54) SYSTEM AND METHOD FOR EXECUTING NON-GRAPHICAL ALGORITHMS ON A GPU (GRAPHICS PROCESSING UNIT)

(71) Applicant: ZIGNAL LABS, INC., San Francisco, CA (US)

(72) Inventors: Alex Smith, Chadron, NE (US); Andras Benke, Bellevue, WA (US); Jonathan R. Dodson, San Francisco, CA (US); Michael Kramer, San Francisco, CA (US); Fabien Vives, San Francisco, CA (US); Adam Beaugh, Kendington, CA (US); Christopher Miller, San Francisco, CA (US)

(73) Assignee: ZIGNAL LABS, INC., San Francisco, CA (US)

( * ) Notice: Subject to any disclaimer, the term of this patent is extended or adjusted under 35 U.S.C. 154(b) by 0 days.

(21) Appl. No.: 16/580,098

(22) Filed: Sep. 24, 2019

(65) Prior Publication Data
US 2020/0098161 A1 Mar. 26, 2020

Related U.S. Application Data

(60) Provisional application No. 62/735,660, filed on Sep. 24, 2018.

(51) Int. Cl.
*G06T 15/00* (2011.01)
*G06T 15/04* (2011.01)
(Continued)

(52) U.S. Cl.
CPC ............ *G06T 15/005* (2013.01); *G06F 17/16* (2013.01); *G06F 40/30* (2020.01);
(Continued)

(58) Field of Classification Search
CPC ....... G06T 15/005; G06T 15/04; G06F 40/30; G06F 17/16; G06K 9/00442; G06K 9/6215; G06Q 50/01
See application file for complete search history.

(56) References Cited

U.S. PATENT DOCUMENTS

| 7,219,085 B2 | 5/2007 | Buck et al. |
| 7,570,267 B2 | 8/2009 | Patel et al. |
| (Continued) | | |

FOREIGN PATENT DOCUMENTS

| DE | 102009013814 A1 | 12/2009 |
| KR | 101580605 B1 | 12/2015 |

OTHER PUBLICATIONS

Kevin, WebGL Lesson One: Getting Started, posted on Jun. 26, 2011 on https://www.learnopengles.com/webgl-lesson-one-getting-started/, accessed on Oct. 24, 2020, 12 pages. (Year: 2011).*

(Continued)

*Primary Examiner* — Haixia Du
(74) *Attorney, Agent, or Firm* — Graeser Associates International Inc.; D'Vorah Graeser

(57) ABSTRACT

A system and method for performing non-graphical algorithm calculations on a GPU (graphics processing unit), by adapting the non-graphical algorithm to be executed according to the texture mapping calculation functions of the GPU, for example within the Web Browser environment. The non-graphical algorithm preferably relates to comparison of a plurality of data points. Each data point may relate to any unit of information, including but not limited to a document (for a document comparison algorithm), information about movements of a unit (for a collision detection algorithm), determination of interactions between two more nodes on a graph, such as for example and without limitation, determining such interactions in a social media channel.

16 Claims, 13 Drawing Sheets

(51) Int. Cl.
  *G06F 17/16* (2006.01)
  *G06K 9/00* (2006.01)
  *G06Q 50/00* (2012.01)
  *G06K 9/62* (2006.01)
  *G06F 40/30* (2020.01)

(52) U.S. Cl.
  CPC ....... *G06K 9/00442* (2013.01); *G06K 9/6215* (2013.01); *G06Q 50/01* (2013.01); *G06T 15/04* (2013.01)

(56) References Cited

U.S. PATENT DOCUMENTS

| | | | |
|---|---|---|---|
| 8,289,341 | B2 | 10/2012 | Sarel et al. |
| 8,326,880 | B2 | 12/2012 | Carson et al. |
| 8,719,283 | B2 | 5/2014 | Koski |
| 8,892,523 | B2 | 11/2014 | Amarendran |
| 9,019,289 | B2 | 4/2015 | Bourd |
| 9,037,464 | B1 | 5/2015 | Mikolov |
| 9,542,477 | B2 | 1/2017 | Lightner et al. |
| 9,852,111 | B2 | 12/2017 | Dasgupta et al. |
| 9,886,501 | B2 | 2/2018 | Krishnamurthy et al. |
| 10,430,718 | B2 | 10/2019 | Yin et al. |
| 2011/0134137 | A1* | 6/2011 | Lee .............. G06T 1/00 345/582 |
| 2013/0124556 | A1 | 5/2013 | Chowdhury et al. |
| 2015/0310862 | A1 | 10/2015 | Dauphin et al. |
| 2015/0324707 | A1* | 11/2015 | Zhou .............. G06T 1/20 717/124 |
| 2016/0019324 | A1* | 1/2016 | Kanderian .......... G06F 17/10 703/2 |
| 2016/0155209 | A1 | 6/2016 | Kim et al. |
| 2018/0005131 | A1 | 1/2018 | Yin et al. |
| 2020/0012919 | A1* | 1/2020 | Bathaee .............. G06N 3/0427 |

OTHER PUBLICATIONS https://medium.com/@gautam.karmakar/manhattan-lstm-model-for-text-similarity-2351f80d72f1 (published Mar. 31, 2018 by Gautam Karmakar, Medium.com), 7 pages.

Mikolov et al ("Efficient Estimation of Word Representations in Vector Space"; Arxiv Sep. 7, 2013), 12 pages.

Mikolov et al ("Distributed Representations of Words and Phrases and their Compositionality"; Arxiv Oct. 16, 2013), 9 pages.

S. Kullback and R. A. Leibler ("On Information and Sufficiency", Ann. Math. Statist., vol. 22, No. 1 (1951), 79-86).

Z. Wu and M. Palmer ("Verb Semantics and Lexical Selection", Arxiv, Jun. 24, 1994), 7 pages.

https://wordnet.princeton.edu/, by Fellbaum, Christiane (first published in 2005), 4 pages.

https://nlp.stanford.edu/projects/glove/, by Pennington et al, first published in Aug. 2014, 3 pages.

A. Conneau, D. Kiela, H. Schwenk, L. Barrault, A. Bordes, Supervised Learning of Universal Sentence Representations from Natural Language Inference Data, Proceedings of the 2017 Conference on Empirical Methods in Natural Language Processing; Sep. 2017, 11 pages.

http://pyvandenbussche.info/2017/translating-embeddings-transe, by Pierre-Yves Vandenbussche, published Aug. 29, 2017, 8 pages.

Cer et al ("Universal Sentence Encoder", https://static.googleusercontent.com/media/research.google.com/en//pubs/archive/46808.pdf, published Mar. 29, 2018), 7 pages.

Shih et al ("Investigating Siamese LSTM networks for text categorization", 2017 Asia-Pacific Signal and Information Processing Association Annual Summit and Conference (APSIPA ASC); abstract only.

Han, J.D., Carr, N. A., Hart, J. C.,"Cache and Bandwidth Aware Matrix Multiplication on the GPU", University of Illinois, pp. 1-6, 2003.

Eurographics 2006, Groller E., and Szimay-Kalos; GerB, A. Guthe, M. and Klein, R., "GPU-based Collision Detection for Deformable Parameterized Surfaces", Institute of Computer Sciences II, Universitat Bonn, Germany, pp. 1-10, vol. 25 (2006) No. 3.

Computation Improvement for the Rigorous Coupled-wave Analysis with GPU, Tong et al, 2012 Fourth International conference on Computational and Information Sciences, 2012.

Parallel Processing of DCT on GPU, Tokdemir and Belkasim, 2011 Data Compression Conference, 2011.

Choi, H., Kim, C., "Performance Evaluation of the GPU Architecture Executing Parallel Applications", The Journal of the Korea Contents Association, vol. 12, 2012, pp. 10-21.

Bailey, M., "Using GPU Shaders for Visualization" Oregon State University, IEEE Computer Graphics and Applications 29 (5), 96-100, 2009.

Bailey, M., "Using GPU Shaders for Visualization, III" Oregon State University, IEEE computer graphics and applications 33 (3), 5-11, 2013.

* cited by examiner

Texture Results

Red = Cosine Similarity
Green = Euclidean Distance
Blue = TS*SS 1027 nodes, 201ms
1027 nodes, 264ms

SYSTEM AND METHOD FOR EXECUTING NON-GRAPHICAL ALGORITHMS ON A GPU (GRAPHICS PROCESSING UNIT)

FIELD OF THE INVENTION

The present invention is of a system and method for executing non-graphical algorithms on a GPU (graphics processing unit), for example via WebGL APIs in the web browser, and in particular, for executing such algorithms that relate to comparison of a plurality of data points.

BACKGROUND OF THE INVENTION

A GPU (graphics processing unit) is used to perform graphical calculations for rendering data for display on a computational device. GPUs have also been used for executing calculations related to neural nets.

DE102009013814A1 relates to performing calculations on a GPU through the transfer of memory as bricks from the CPU to the GPU. U.S. Pat. No. 9,019,289 relates to efficient parallel execution of graphics applications and non-graphics applications on a GPU.

BRIEF SUMMARY OF THE INVENTION

The present invention overcomes the limitations of the background art by providing a system and method for performing non-graphical algorithm calculations on a GPU (graphics processing unit), by adapting the non-graphical algorithm to be executed according to the texture mapping calculation functions of the GPU, for example available to the Web Browser through WebGL APIs. The non-graphical algorithm preferably relates to comparison of a plurality of data points. Each data point may relate to any unit of information, including but not limited to a document (for a document comparison algorithm), information about movements of a unit (for a collision detection algorithm), determination of interactions between two more nodes on a graph, such as for example and without limitation, determining such interactions in a social media channel.

By "non-graphical algorithm" it is meant an algorithm that is not intended to render data for display on a computational device.

In the past five years, use of the APIs opening GPU functions inside of the modern web browser (WebGL, a subset of OpenGL) have seen tremendous growth. This evolution has been geared mainly toward rendering features comparably to a native OpenGL experience in a classic C language suite versus JavaScript in the Browser.

OpenGL has a feature lacking in the browser called Compute Shaders. With a Compute Shader the GPU can be used to compute numbers through the GPU, such as for example the Nvidia CUDA or OpenCL. Compute Shaders are not available to the web browser WebGL APIs. Thus, one can create different compute shaders for use within WebGL. As a non-limiting example, an efficient method for compute shader processing within the web browser is provided below.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to as a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DESCRIPTION OF AT LEAST SOME EMBODIMENTS

Figure 1A:
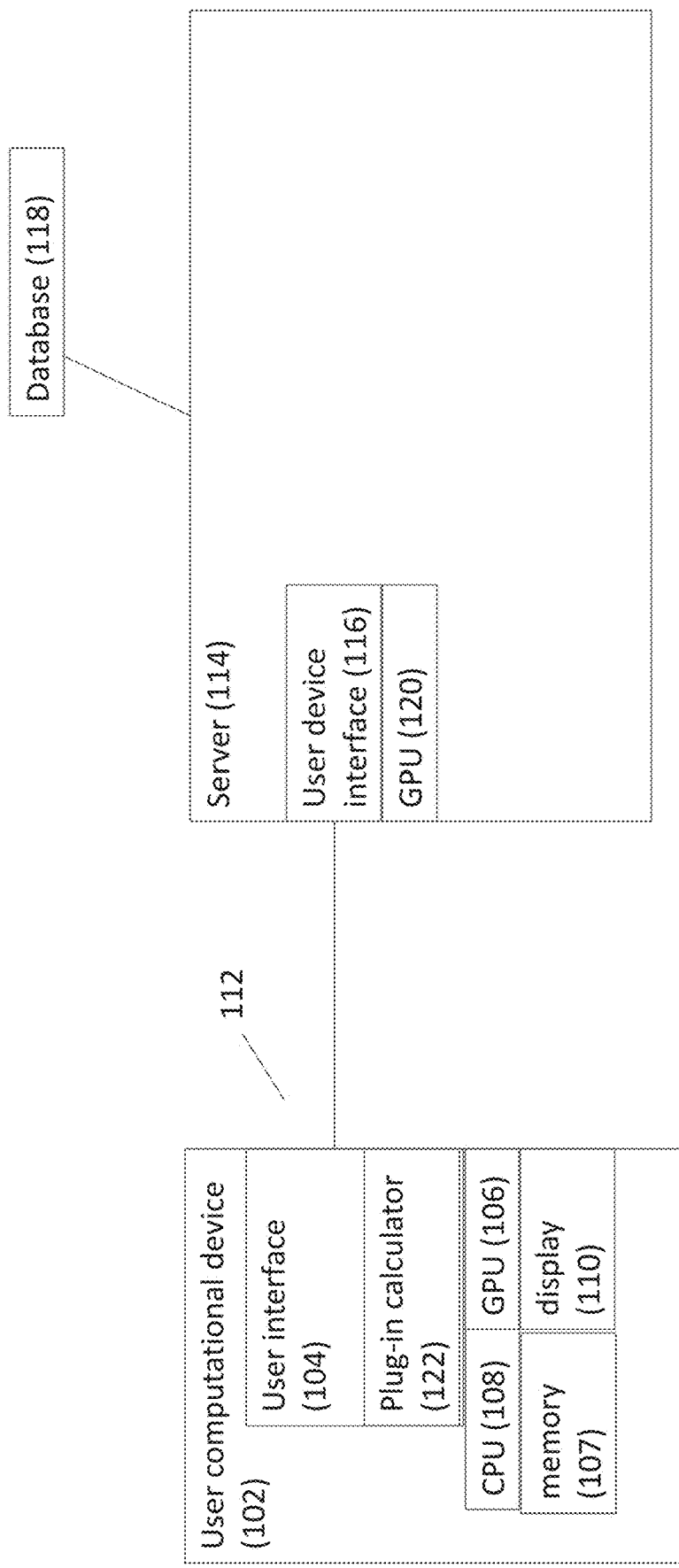
FIGS. 1A-1C relate to non-limiting examples of illustrative systems according to at least some embodiments of the present invention.

According to at least some embodiments, there is provided a method for performing calculations involving large numbers of vectors and/or with complex dimensionality. As an example, the method may be used for comparing large numbers of documents to each other, where the documents are represented by vectors. As another example, the method may be used for performing matrix calculations for large matrices (that is, matrices of high dimensionality), if the matrices are symmetrical or can be rendered symmetrical.

As a non-limiting example, the method may be applied to solving problems which may be decomposed to analysis of a plurality of features, as such features may be rendered as vectors. For analysis of a large number of documents, tokenization of the documents results in the documents being representable as vectors.

By "document", it is meant any text featuring a plurality of words. The algorithms described herein may be generalized beyond human language texts to any material that is susceptible to tokenization, such that the material may be decomposed to a plurality of features.

Various methods are known in the art for tokenization. For example and without limitation, a method for tokenization is described in Laboreiro, G. et al (2010, Tokenizing microblogging messages using a text classification approach, in 'Proceedings of the fourth workshop on Analytics for noisy unstructured text data', ACM, pp. 81-88).

Once the document has been broken down into tokens, optionally less relevant or noisy data is removed, for example to remove punctuation and stop words. A non-limiting method to remove such noise from tokenized text data is described in Heidarian (2011, Multi-clustering users in twitter dataset, in 'International Conference on Software Technology and Engineering, 3rd (ICSTE 2011)', ASME Press). Stemming may also be applied to the tokenized material, to further reduce the dimensionality of the document, as described for example in Porter (1980, 'An algorithm for suffix stripping', Program: electronic library and information systems 14(3), 130-137).

The processed tokens are then optionally assembled into vectors, for example in order to search through the vectors (and hence through the original documents) for a particular query, or to compare the vectors (and hence to compare the original documents). One method for assembling such vectors is through the Vector Space Model (VSM). Various vector libraries may be used to support various types of vector assembly methods, for example according to OpenGL. The VSM method results in a set of vectors on which addition and scalar multiplication can be applied, as described by Salton & Buckley (1988, 'Term-weighting approaches in automatic text retrieval', Information processing & management 24(5), 513-523). Regardless of the vector building method that is used, preferably the resultant vectors can be analyzed through addition and scalar multiplication. Additional vectorization methods that may be applied are described below.

To overcome a bias that may occur with longer documents, in which terms may appear with greater frequency due to length of the document rather than due to relevance, optionally the vectors are adjusted according to document length. Various non-limiting methods for adjusting the vectors may be applied, such as various types of normalizations, including but not limited to Euclidean normalization (Das et al., 2009, 'Anonymizing edge-weighted social network graphs', Computer Science, UC Santa Barbara, Tech. Rep. CS-2009-03); or the TF-IDF Ranking algorithm (Wu et al, 2010, Automatic generation of personalized annotation tags for twitter users, in 'Human Language Technologies: The 2010 Annual Conference of the North American Chapter of the Association for Computational Linguistics', Association for Computational Linguistics, pp. 689-692).

After the vectors are optionally adjusted, they are analyzed through one of various suitable algorithms, for example for comparing the vectors to each other or to a vectorized search term. Any suitable algorithm may be used, as any type of vector analysis algorithm is susceptible to the approach described herein for GPU calculations. Preferably geometric comparison methods are used. Non-geometric comparison methods would need further processing and/or adjustments to be used according to the method described herein, for example by being unwound to fit into this model, and/or parallelized in multiple textures/render passes.

For example, for a method comprising an asymmetric or other processing model (such as a model in which a series of processes would be run on one or many points, without comparing them to each other for example), the method is preferably decomposed to a series of compute processes per node, each process outputting to one or many different textures. Those output textures could then feed into further shaders/compute processes.

Various non-limiting examples of geometric comparison methods that may be used with the present invention are given herein. One non-limiting example of such a method involves a calculation of similarity between vectors according to Euclidean distance. Another non-limiting example of such a method involves LSI (Latent Semantic Indexing) which is then combined with cosine similarity or another such method for calculating similarity. Cosine similarity measures the cosine of the angle between two vectors.

Yet another non-limiting example of such a method is t-SNE (T-distributed Stochastic Neighbor Embedding), which is a visualization method for reducing data dimensionality (L. J. P. van der Maaten. Accelerating t-SNE using Tree-Based Algorithms. Journal of Machine Learning Research 15(October):3221-3245, 2014). Still another non-limiting example of such a method is TS*SS, which features a combination of Triangle's Area Similarity and Sector's Area Similarity calculations through vector multiplication (Heidarian and Dinneen, 2016, A Hybrid Geometric Approach for Measuring Similarity Level Among Documents and Document Clustering, 2016 IEEE Second International Conference on Big Data Computing Service and Applications).

Further non-limiting examples of suitable methods include edit distance comparison methods, token based comparison methods and sequence based comparison methods. These methods relate to comparison of strings. Edit distance comparison methods determine the number of operations (changes) required to transform a first string into a second string. The changes are typically performed character by character. The greater the number of changes required, the lower the similarity between the strings. Non-limiting examples of edit comparison methods include Hamming Distance, Levenshtein Distance and Jaro-Winkler.

The Hamming Distance method involves overlaying two strings and looking for points of difference, with 0 being completely different and 1 being identical. The Levenshtein Distance method involves performing three operations—insertion, deletion and substitution—to transform one string into another. The scoring is also from 0 to 1, but the Levenshtein Distance can be more accurate, given the greater flexibility of the comparison. The Jaro-Winkler method also includes order as a factor in determining similarity.

Token based comparison methods receive a plurality of tokens as input, rather than complete strings. The tokens do not need to be single characters. Various tokenization methods may be used to create the tokens, as described in greater detail below. The number of common tokens determines the degree of similarity. Non-limiting examples of token comparison methods include Jaccard index and Sorensen-Dice.

The Jaccard index is sensitive to the method of tokenization, because it relates to dividing the number of common tokens by the number of unique tokens. Therefore, different tokenization methods would be expected to provide different results. The Jaccard index is also known as Intersection over Union and the Jaccard similarity coefficient (originally given the French name coefficient de communauté by Paul Jaccard). Overall, the Jaccard Index more generally is a statistic used for gauging the similarity and diversity of sample sets. A non-limiting example of implementation and testing of the method is described in greater detail below with regard to FIGS. 8A-8B.

Sorenson-Dice uses a slightly different method for calculating similarity, which can result in an overestimation of similarity. In this case, the number of common tokens is doubled, and then divided by the total number of tokens. It is also sensitive to the tokenization method selected.

Sequence based comparison methods look for the maximum number of substrings shared between the two strings, with a greater number of substrings indicating greater similarity. Non-limiting examples of sequence based comparison methods include Ratcliff-Obershelp. This method involves recursively breaking up a string into a plurality of substrings, until a minimum length string is reached. Then all of the substrings are compared, for example using any of the above methods. The similarity score is computed as twice the number of common characters (that is, in compared sub strings) divided by the total number of characters in all substrings.

Further non-limiting examples relate to methods for comparing two texts in terms of both lexical similarity and semantic similarity. Lexical similarity relates to the similarity of the words in the text, while semantic similarity relates to the meaning. The latter can be affected by word order (eg, "the dog chased the cat" is different from "the cat chased the dog") for example. These methods involve comparing documents as vectors of features, which do not only relate to the words contained therein. Non-limiting examples of such methods include Jaccard Similarity (Jaccard index), K-means, Cosine Similarity, Word2Vec and Smooth Inverse Frequency with Cosine Similarity, LSI (Latent Semantic Indexing) with Cosine Similarity, LDA with Jensen-Shannon distance, Word Mover Distance, Variational Auto Encoder (VAE), Universal sentence encoder, Siamese Manhattan LSTM, Latent Dirichlet Allocation (LDA), Kullback-Leibler, Universal Sentence Encoder, word2vec, GloVe, InferSent (Facebook Research), Google Sentence Encoder (a Deep Averaging Network (DAN)), Siamese Manhattan LSTM (MaLSTM), MaLSTM (Manhattan LSTM), WordNet, TransE, Wu and Palmer, and Resnek.

A number of the above methods or combinations of methods may be improved by combining them with different word embeddings, including the following methods: K-means, Cosine Similarity, a combination of Word2Vec plus Smooth Inverse Frequency plus Cosine Similarity, LSI plus Cosine Similarity, LDA plus Jensen-Shannon distance, Word Mover Distance, Variational Auto Encoder (VAE), Universal sentence encoder, and Siamese Manhattan LSTM.

A number of the above methods involve first converting sentences to vectors. Various methods are available for vectorization, including but not limited to converting text to word count vectors with CountVectorizer, to word frequency vectors with TfidfVectorizer or to unique integers with HashingVectorizer (all available through the scikit-learn platform; see for example http://scikit-learn.org/stable/). Other methods available for vectorization include word embedding methods, such as for example Fastext, Glove, Word2Vec, Continuous Bag of Words (CBoW) or Skip Gram models. Word embedding methods usually create one vector per word and as such, are better at identifying or relating to context of a word. As noted above, the word embedding method selecting may have a significant effect on the output and efficacy of the text comparison method.

The above methods are described for example in https://medium.com/@adriensieg/text-similarities-da019229c894, as well as http://nlp.town/blog/sentence-similarity/.

The above methods for comparison are all suitable for comparing a plurality of vectors as they may all be adjusted for vector comparison through vector multiplication. Vector multiplication through the GPU is very efficient, because the data can be structured to reduce the number of operations. The data is structured by using a process for which the GPU was designed and at which it is very efficient: texture mapping.

Texture mapping involves adjusting a two dimensional visual data map, for example by resizing, distorting, rotating and so forth. These adjustments enable the two dimensional map to be applied to three dimensional graphics as texture. Texture mapping is a process which is built into the hardware of the GPU and as such, it is very efficient. As the two dimensional data is a map, it has a plurality of two dimensional coordinates, each of which is then mapped to a vertex of a three dimensional graphic object.

The GPU receives chunks of the two dimensional map for rasterization into pixel fragments. The fragments are shaded to compute a color at each pixel. This shading process is performed by a GPU fragment shader. For the operation of the method of the present invention, the vectors that are to be analyzed are provided to the GPU fragment shader with a structure that enables them to be rapidly analyzed.

Preferably, the two dimensional texture data entering the GPU fragment shader is structured as a triangle with the indices (both column and row) being built into the edge structure of the triangle. Preferably, for comparison of two vectors, one vector is mapped to start at one edge of the triangle while the other vector is mapped to start at the other edge of the triangle. In other words, the two dimensional map that is fed to the GPU is constructed to have a triangle shape rather than a rectangular or other shape. The result of any number compared to any other number is nothing more than a X*Y pixel location within the texture output by the GPU process. The comparison method is applied, unless it is used to calculate the texture mapping transformation for the output.

Figure 1B:
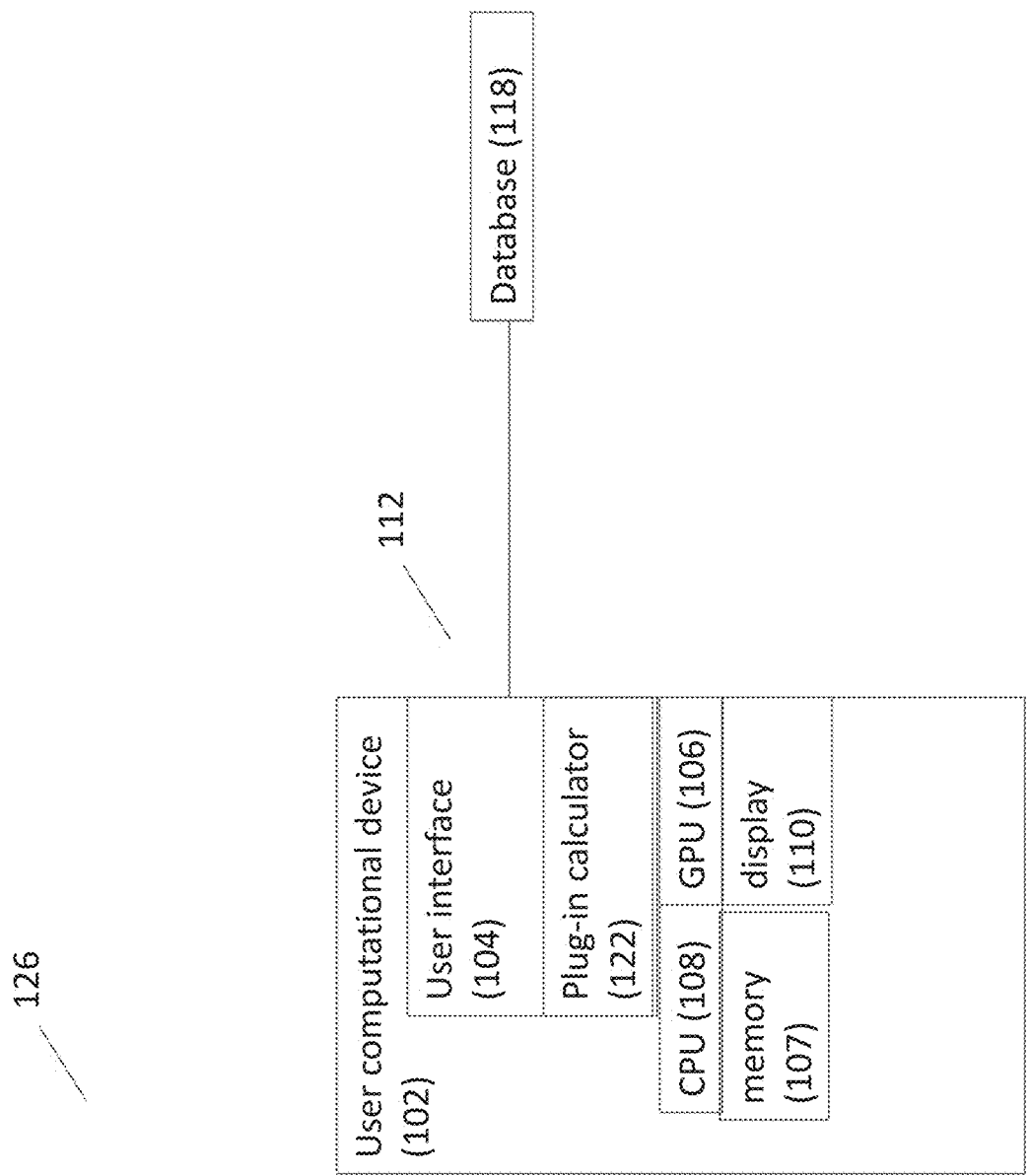
Figure 1C:
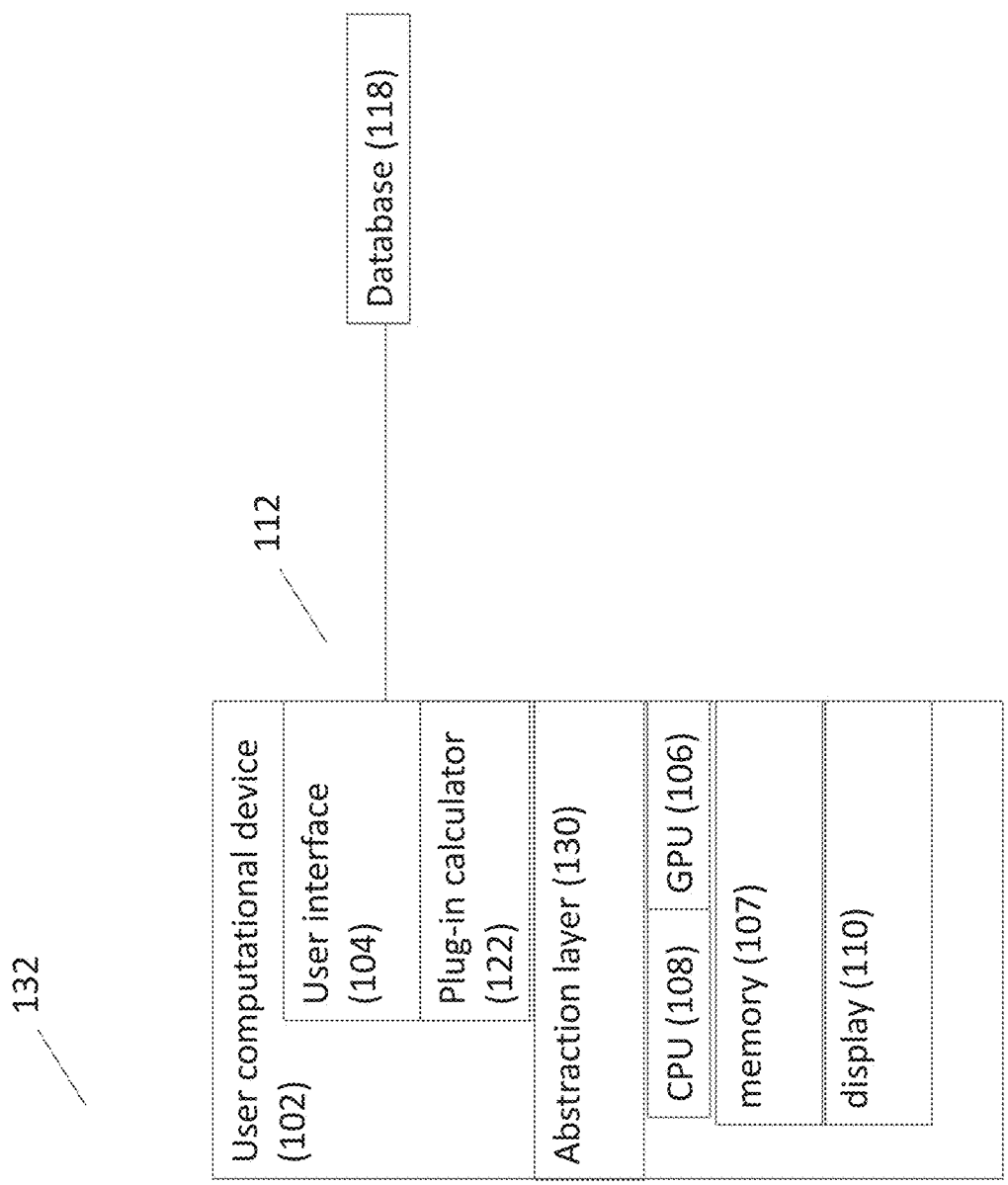

Turning now to the drawings, FIGS. 1A-1C relate to non-limiting examples of illustrative systems according to at least some embodiments of the present invention.

FIG. 1A shows a non limiting exemplary system for providing calculations on a graphical processing unit or GPU according to at least some embodiments of the present invention. As shown in FIG. 1A in a system 100, there is provided a user computational device 102 communicating with the server 114 through a computer network 112. Server 114 may optionally be a physical server, a plurality of such servers and/or one or more virtual computers or processors and/or a cloud computing device or service. User computational device 102 operates a user interface 104, which communicates with the user device interface 116 on server 114.

User computational device 102 at least features a GPU 106 and may also feature a CPU 108. Functions of GPU 106 and CPU 108 preferably relate to those performed by a processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as a memory 107 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function. Calculations and processing may optionally be passed to GPU 106 and/or CPU 108 as necessary. The results are then shown on the display 110.

In addition, user computational device optionally features a plug-in calculator 122 which may be used to perform one or more calculations through GPU 106 and/or CPU 108. Optionally plug-in calculator 122 performs or supports the performance of calculations necessary as described herein, for example, to perform document comparison, algorithms and/or collision algorithms. For example, plug-in calculator 122 may operate as an API (application program interface) to support calculations through GPU 106 and/or CPU 108. Plug-in calculator 122 may take some simple parameters for initial processing. As described with regard to FIG. 1C, plug-in-calculator may further call an abstraction layer, for performing such initial processes and/or other processes.

Plug-in calculator 122 may also receive support from server 114 featuring a GPU 120, which may also pull information from a database 118. Again, processing may be divided between user computational device 102 and server 114 as well as between GPU 106, CPU 108 and GPU 120 as necessary.

Optionally and preferably, GPU 106 performs texture mapping calculations. A non-graphical algorithm is preferably adapted so that execution of such an algorithm may be performed by GPU 106 through said texture mapping calculations. For example, the non-graphical algorithm may comprise a matrix calculation, which is then performed by GPU 106 through said texture mapping calculations. Optionally, the non-graphical algorithm may comprise comparison of a plurality of vectors through a geometric comparison method comprising such a matrix calculation, which is again well adapted to execution by GPU 106.

Also optionally, memory 107 is configured for storing a defined native instruction set of codes. GPU 106 and CPU 108 are configured to perform a defined set of basic operations in response to receiving a corresponding basic instruction selected from the defined native instruction set of codes stored in memory 107. For example, such codes may comprise a first set of machine codes selected from the native instruction set for receiving data for analysis, a second set of machine codes selected from the native instruction set for executing texture mapping by GPU 106 and a third set of machine codes selected from the native instruction set for executing the non-graphical algorithm according to the texture mapping.

Instructions described as being executed by GPU 106 may also be executed, in whole or in part, by GPU 120.

FIG. 1B shows another implementation of a system for performing calculations with a GPU, in this case limited to user computational device 102. Components with the same reference number have the same or similar function has in FIG. 1A. A system 126 now features, and may be limited to, user computational device 102 communicating directly with a database 118, which may either be attached to or indirect communication with user computational device 102 and/or may communicate through a computational network 112 as previously described. Again, calculations may be passed between GPU 106 and/or CPU 108 according to information, for example, obtained from database 118 by a plug-in calculator 122. The functions of GPU 106 and/or CPU 108 may be performed as described above with regard to FIG. 1A.

Optionally as shown in FIG. 1C for an exemplary system 132, user computational device 102 further comprises an abstraction layer 130 (this implementation may also be used with the system shown in FIG. 1A). Abstraction layer 130 may support simpler or more streamlined interactions with GPU 106, whether directly or through a platform such as WebGL, as described in greater detail below. Such an implementation could support use of dynamic code, rather than manual (static) code compiling. Abstraction layer 130 may for example provide one or more developer-friendly service layers, for example to call the low-level shader libraries that do the computation at GPU 106. As a non-limiting example, abstraction layer 130 could support computing through API (application program interface) calls, for example from plug-in calculator 122. Plug-in calculator 122 may receive an algorithm, some thresholds/filters, date ranges/query parameters and/or other information, and then call abstraction layer 130.

As a non-limiting example, suppose a Jaccard similarity method is to be performed on a batch of topic vectors. Plug-in calculator 122 optionally provides a user interface (not shown) to receive the data for such topic vectors and to select an algorithm of interest, such as Jaccard similarity. Output may be provided to another location, such as for display on display 110, or for output to another process. Plug-in calculator 122 may then call an API method .jaccard (data).pipe(output) in abstraction layer 130. Abstraction layer 130 may be configured to use Jaccard WebGL directly (or OpenCL if being operated on a server). Abstraction layer 130 may alternately use CPU 108 and/or memory 107 to do multi-step algorithms, neural nets, or processes. The results are then output by abstraction layer 130.

Abstraction layer 130 may also support calculation of multiple texture features in parallel. Without wishing to be limited in any way, currently GPUs may support 12-14 of such calculations in parallel. Abstraction layer 130 may be able to structure compute shader nodes to operate on a single computational pipeline or process, such as for recursive neural networks, parallel algorithms or processing pipelines for example.

Abstraction layer 130 may also support a library of previously prepared algorithms and functions, such as implementations of the various comparison methods described herein. Also abstraction layer 130 may support a plurality of GPUs or clusters thereof (not shown).

Optionally, abstraction layer 130 comprises a plurality of computer instructions (which can be a set of instructions, an application, software) which are operable on a computational device (as noted, e.g., a processor) to cause the computational device to conduct and/or achieve one or more specific functionality. For this non-limiting example, such a processor is preferably GPU 106. Abstraction layer 130 may also be a circuit (e.g., an ASIC) to conduct and/or achieve one or more specific functionality.

For a plurality of computational devices linked together for computations, such as that shown in FIG. 1A (optionally with additional computational devices), if communication with GPU 106 and/or GPU 120 is performed through WebGL as a platform, then websockets may be further used (not shown). Websockets can transmit binary data into WebGL, meaning a straight memory-to-memory transfer from a server to a client. Such an implementation would allow for flexible and scalable cooperative computing arrangements, through connected GPU resources.

Optionally, in place of or in addition to any of the above GPUs, an FPGA or ASIC (Application Specific Integrated Circuit) may be used. The FPGA is the specific representation of an algorithm on hardware, whereas the GPU is the generalized representation of an algorithm on the hardware. In GPGPU programming, the GPU has say a dozen or two transistors and circuits that are made to do one purpose: render graphics very fast, hundreds of times per second. The FPGA is like a dynamic GPU that can create new hardware on the fly. Therefore, instead of a dozen transistors/circuits, there may be hundreds or thousands present. The ASIC may be customized to better support the methods as described herein.

For any of the above implementations, optionally other types of software may be used to perform calculations regardless of whether the calculations are performed on GPU 106 and/or CPU 108.

Figure 2:
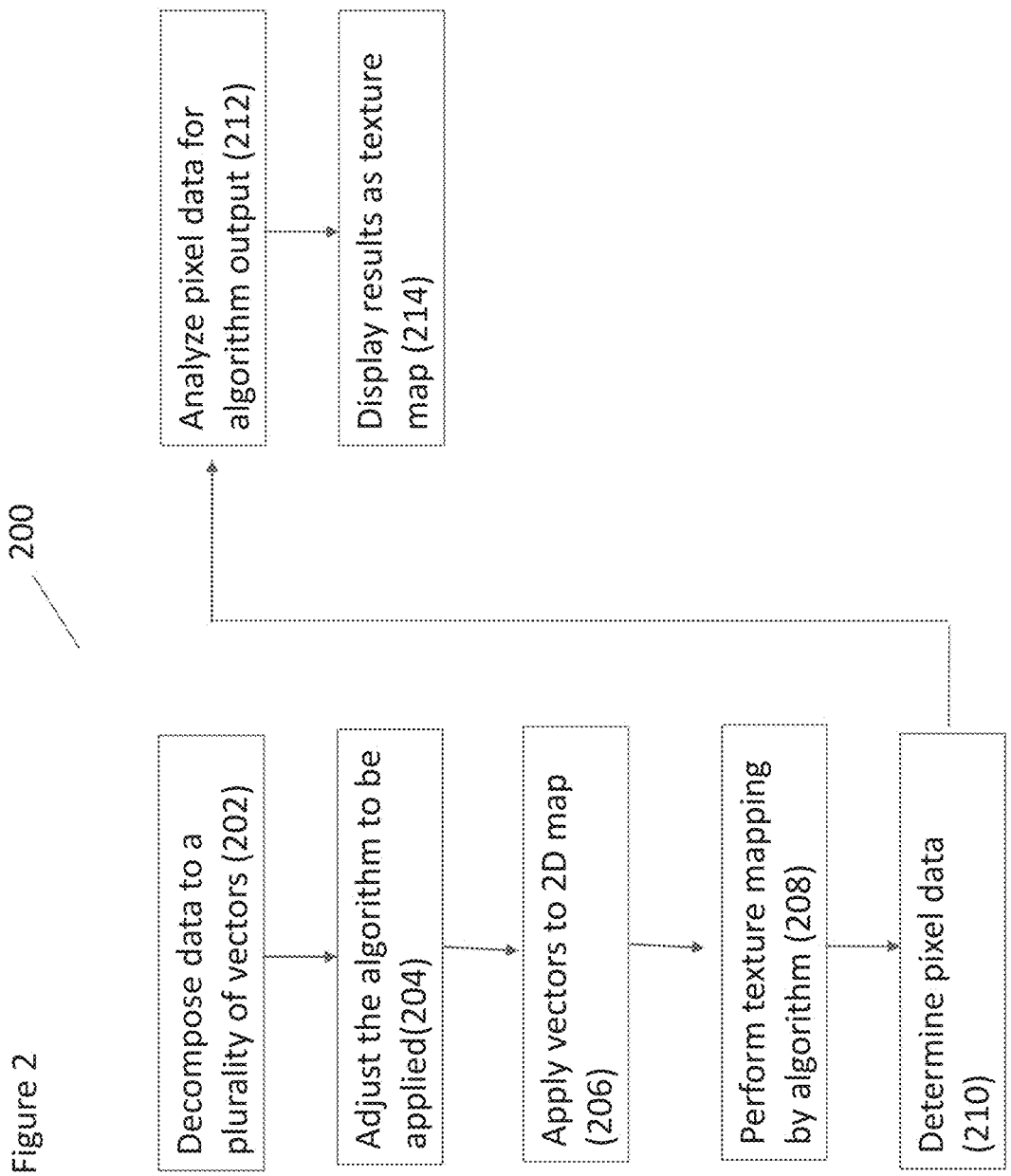
FIG. 2 relates to a non-limiting exemplary method for analyzing data according to at least some embodiments of the present invention.

FIG. 2 shows a non-limiting exemplary method for performing calculations on a GPU as described herein. In a method 200, the data is first preferably decomposed to plurality of vectors in 202. Optionally other methods may be used for performing the data calculations, however, decomposing the data to plurality of vectors is efficient particularly for performing calculations and algorithms on a GPU.

Next, the method to be applied is adjusted in 204. It is preferably adjusted so that it can operate with the plurality of vectors and also so that it can be calculated through the texture mapping functions of a GPU as described in greater detail below. The vectors are then applied to a two dimensional map in step 206. By applying the vectors to a two dimensional map, the map may then be input into the texture mapping functions of the GPU as described below. In step 208, texture mapping is performed by the method on the GPU. GPUs are able to perform texture mapping and various texture mapping algorithms are known in the art for particularly efficient calculation on a GPU.

Any suitable texture mapping type method may be used in step 208 preferably as adjusted as previously described in step 204 so that in fact the method is susceptible to the particular functions of the GPU for performing texture mapping. In step 210, the output of the texture mapping is used to determine pixel data. The pixel data may then be analyzed in step 212 for the algorithm output. In this case, the texture mapping function of the GPU is used to perform a calculation such as, for example, for document comparison and/or collision detection as described in greater detail below. The output of texture mapping functions on a GPU is pixel data because that was the original intended use of GPU texture mapping is to output pixels which may then be shown on the display.

However, in this case, the output pixel data contains within it the output of the method which was adjusted in step 204. The results may actually be displayed as a texture map in step 214 and/or maybe used for further processing as described in greater detail below.

Optionally, communication with the GPU is performed through a platform such as WebGL. Other suitable communication platforms may also be used for such communication. One advantage of using WebGL, without wishing to be limited by a closed list, is that it may be executed through a web browser, which in turn provides a lightweight yet robust display interface for any graphically rendered results.

Figure 3:
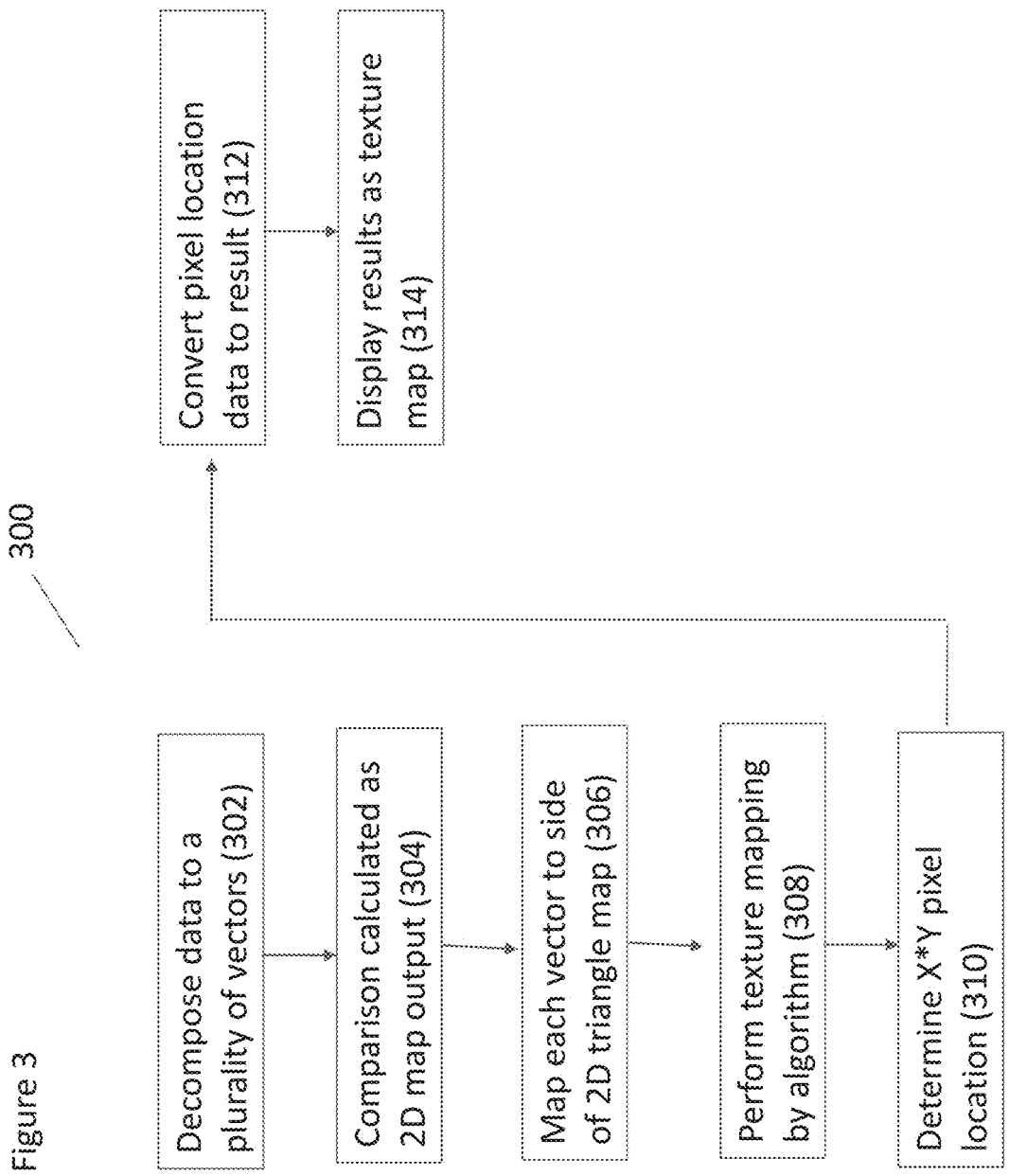
FIG. 3 relates to a non-limiting exemplary method for document comparison according to at least some embodiments of the present invention.

FIG. 3 relates to a particular implementation of texture mapping on a GPU to perform calculations in an algorithm in this non-limiting example for comparison algorithm. As shown in the method 300, data is decomposed to a plurality of vectors in step 302 as previously described. Again, the comparison is calculated as a 2D map output in 304 as previously described.

Now, each vector is mapped to a side of a 2D triangle map in step 306. Because document comparison is preferably performed pairwise as described herein, the two halves of the comparisons are symmetrical. That is comparing document one to document two should produce the same output. That is to say the same result as comparing document two to document one. Therefore, only half the comparisons need to be performed such that the vectors can be mapped to the sides of a two dimensional triangle map in 306 for more efficient calculations. The texture mapping is then performed by the algorithm in step 308. The document comparison algorithm is used to compare similarity between two documents.

Figure 4:
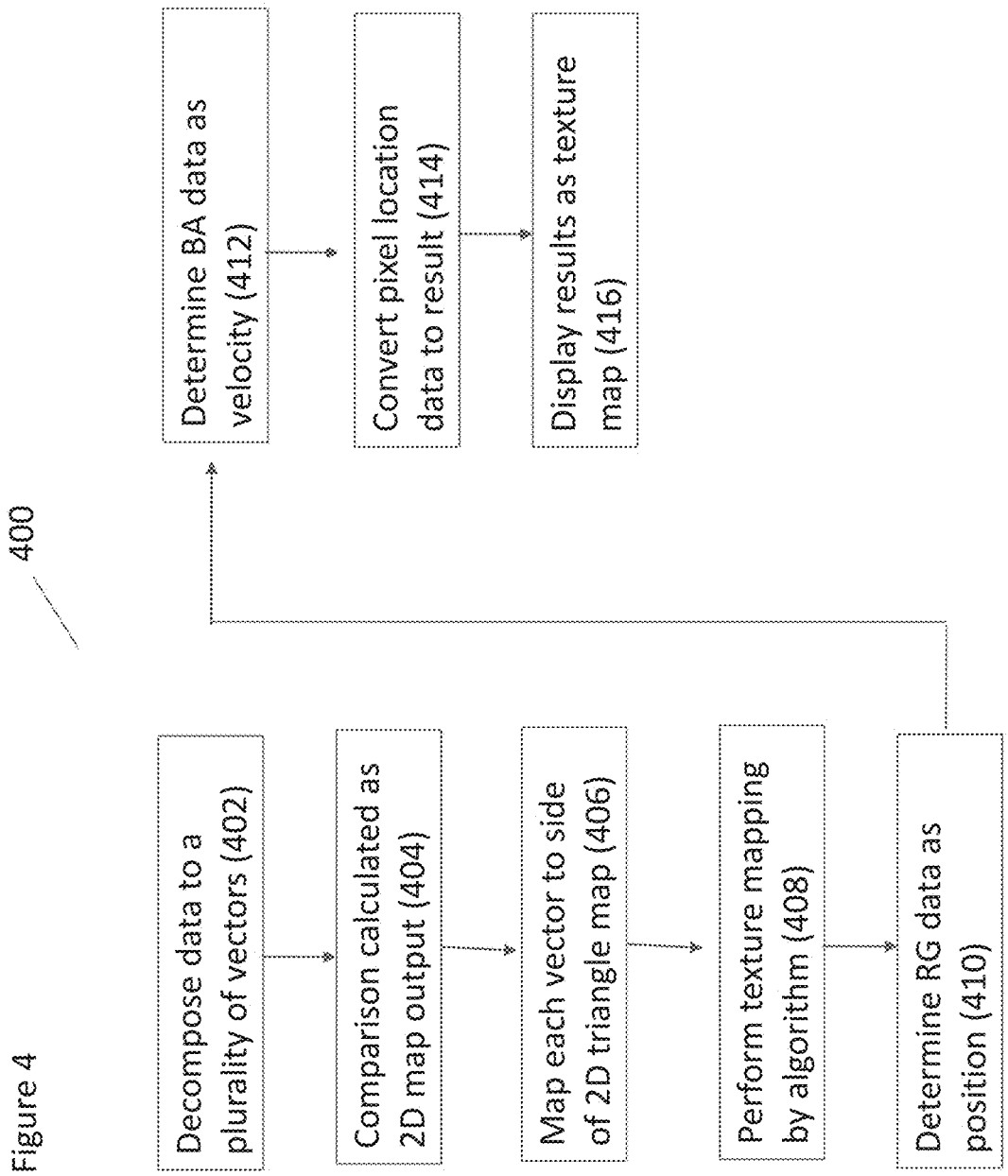
FIG. 4 relates to a non-limiting exemplary method for collision detection according to at least some embodiments of the present invention.

Various non-limiting examples are described herein with regard to suitable document comparison algorithms. These document comparison algorithms as described in greater detail below may then be effectively calculated through a texture mapping algorithm on the GPU in 308. Next, the XY pixel locations as determined in step 310 and the pixel location data is used to determine the results by converting the pixel location data to the comparison result. Again, the results may be displayed as a texture map in 314 and/or may be output for use in other algorithms. FIG. 4 relates to a non-limiting exemplary method and implementation for calculation on GPU, in this case for a collision algorithm.

As shown in a method 400, again data is decomposed to plurality of vectors in 402 and the comparison is calculated as a 2D map output in 404. Again, each vector is mapped to the side of a 2D triangle map in 406 and the texture mapping is performed by the algorithm in 408. In 410, the RG data is determined as position and in 412, the BA data is determined as velocity. Next, the pixel location data is converted to the result in 414 and again, the results may be displayed as a texture map in 416. Implementations of the document comparison and collision algorithms are described in greater detail below.

Figure 5:
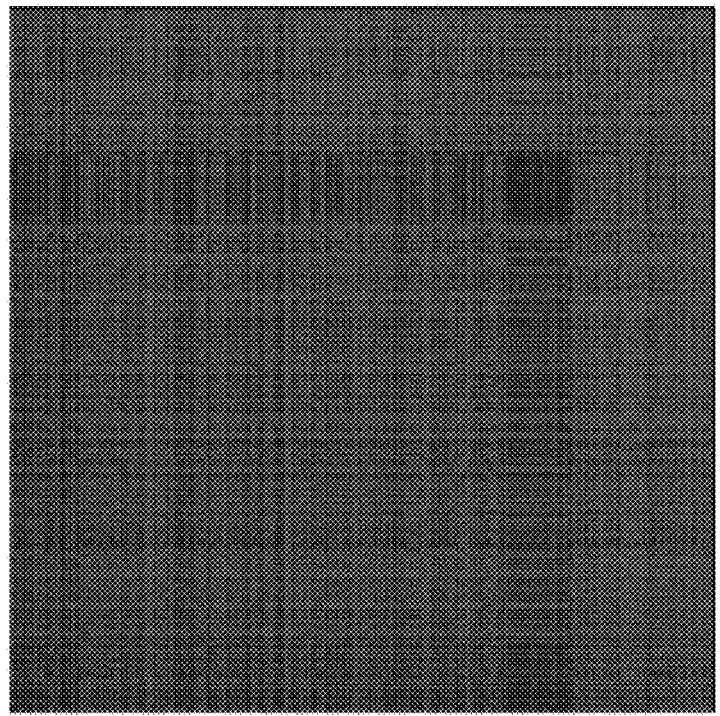
FIG. 5 shows some non-limiting, exemplary texture results.
Figure 5:
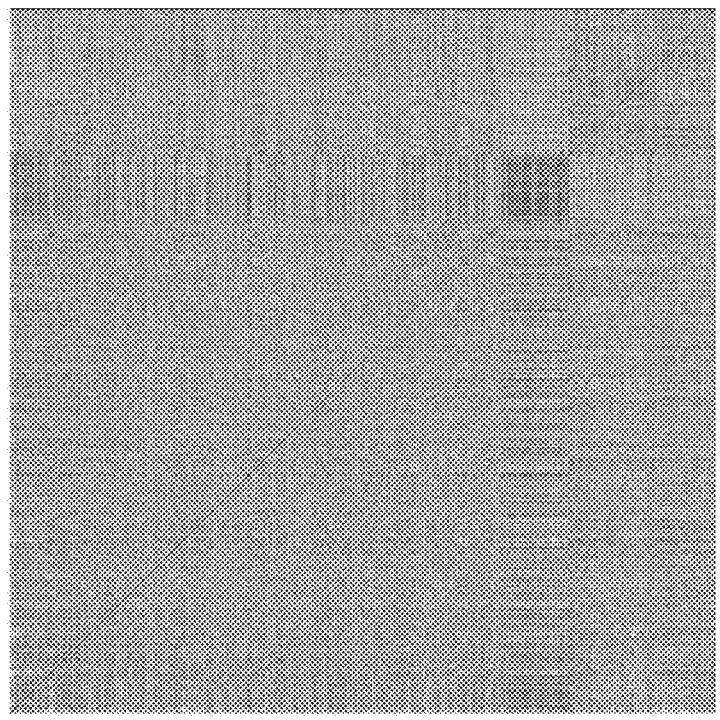

FIG. 5 shows some non-limiting, exemplary texture results. As shown, the two documents are identified by row and column number, while the measure of similarity in the implemented algorithm appears in the RGBA value for that pixel. Each row of pixels in the mapped texture provides information about document number [row #]. Each column shows the results of the comparison of document number # [row] versus document number # [column].

Two vectors of many vectors are input on a triangle. To get the value of document #5 versus document #7, for instance, the result can be found in the output for row #5, cell (pixel) #7. The RGBA (pixel) cell has 4 values. So in the case of similarity, an RGBA vector such as (89.45678,0.0, 0.0,0.0) would indicate through the R value alone, that document #5 is 89% similar to document #7.

This method is efficient for a number of reasons. For example it is not necessary to recalculate the similarity of document #5 with document #2, given that the reverse comparison was already calculated when performing all comparisons for document #2 (in row #2).

Optionally, instead of vectors, the above process is performed with a plurality of data points. For example, for collision detection, a plurality of points may be fed into the texture mapping process of the GPU, adjusted according to the collision detection algorithm. Collision detection is one useful component in large network graph visualizations for instance. In this case, the Alpha (A) value of each pixel in the shader is used to convey the collision detection data, resulting in long straight lines.

Each cell is a unit vector within the triangle. Green, alpha show the velocity positions. RB is the specific position of the data point.

A plurality of positions and velocities, one per each document in a set of documents, is encoded into a triangle shape on a shader texture. On the input texture, the edges of the triangle contain the position/velocity vectors as [R,G,B, A]=>[position.x,position.y,velocity.x,velocity.y]. Once again, with each 'row' of pixels representing a single document that will get compared against every document in a set following this document, we will compare the positions/velocities of each point against every other point to determine the current position and velocity of each point. One unique part about collision detection is that although the lookup table (data not on the edges of the triangle) can be useful to see just which points a particular particle may be colliding with or close to at any given moment, one may only use the data on the outer edges of the output texture, which contains the updated position/velocity for that point.

The collision detection method involves considering every other point, and determining the position, and velocity of each point, in comparison to all other points. If a point was already processed, the information can be determined from a previous calculation.

For collision detection, it is only necessary to determine collisions. But to find the closest 10 pixels, other data is required. For example, for a diagonal row, iterate through 1000 dots to draw, use edges to find location. The entire row is used if dot 500 is interesting; all values after that are ones that are potentially colliding (in a straight line).

One non-limiting example is for a bot detector for use of the above collision detection. Bot detection in social media applications is described with regard to U.S. Provisional Application No. 62/689,889, filed on 26 Jun. 2018, owned in common with the instant application, which is hereby incorporated by reference as if fully set forth herein. For bot detection, each unique author in a social media channel is assigned a dot or data point. Collisions then indicate which authors are interacting.

Figure 6A:
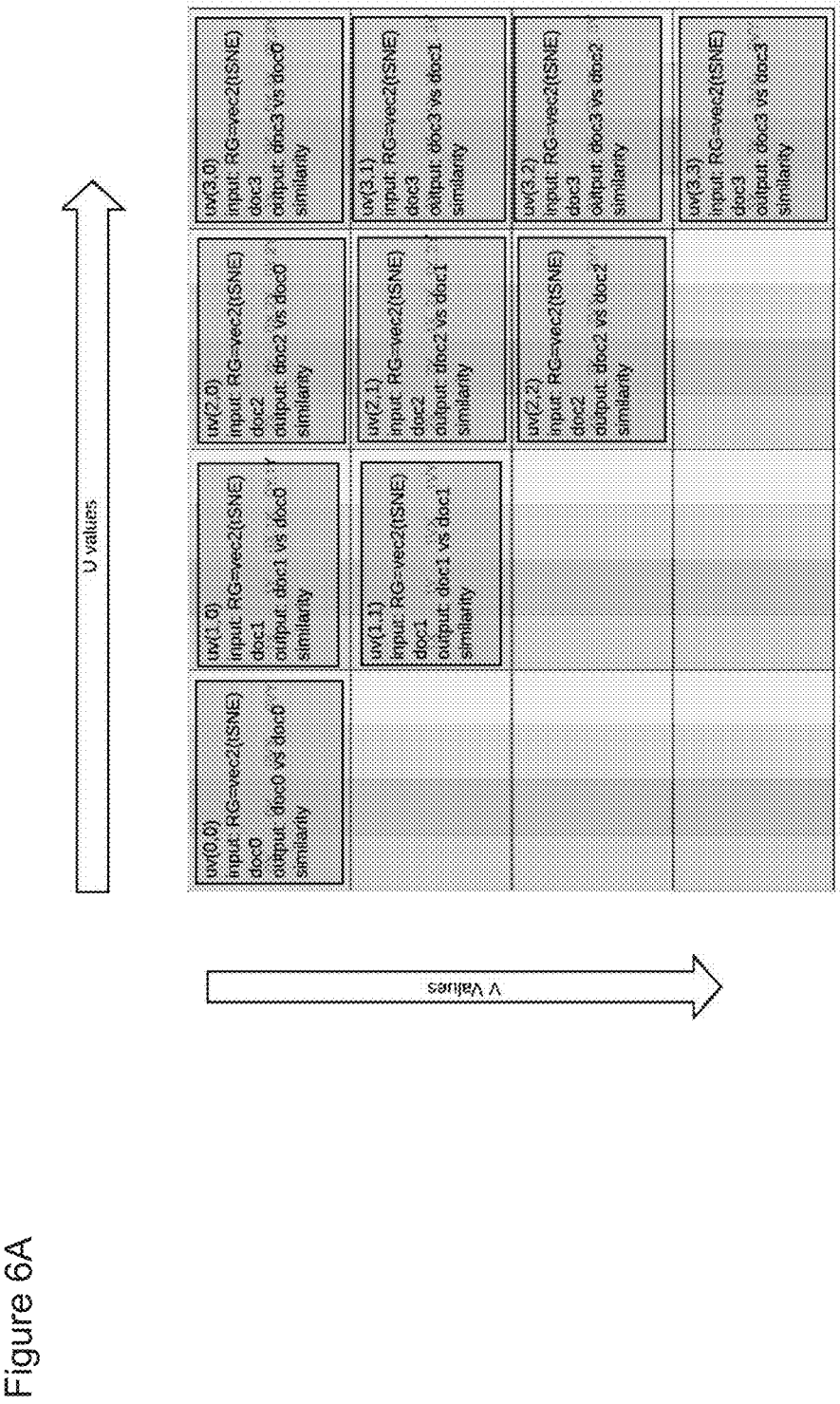
FIGS. 6A and 6B relate to non-limiting examples of the operation of the above described methods for comparing a plurality of documents to determine similarity.
Figure 6B:
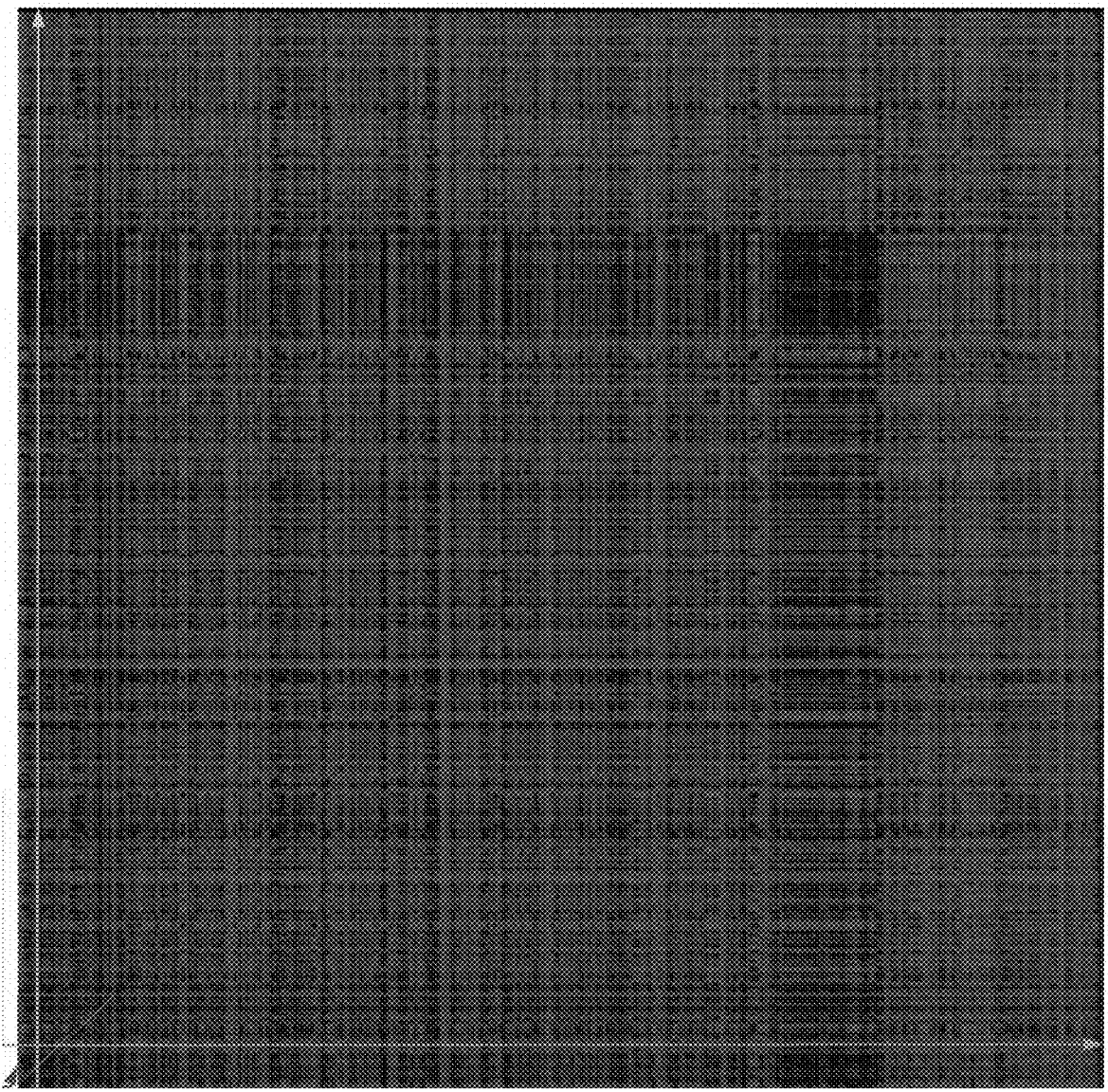

FIGS. 6A and 6B relate to non-limiting examples of the operation of the above described methods for comparing a plurality of documents to determine similarity. As shown with regard to FIG. 6A, an exemplary set of output values are demonstrated with regard to document similarity. Each RGBA output value is written independent of any other neighboring output value. The document is structured so that each row of V values will represent one singular document versus the U value which is the document to compare against.

The method preferably operates by iterating through each RGBA cell, and using the UV values to determine for which two documents the RG values should be compared. As an example for a reference texture: uv(2,1) will use RG value in the input texture UV(2,0) as the vector2(tSNE) value for document 2. The value for document 1 will be found in the RG value in the input texture UV(1,0).

Now that the two values for document 2 and document 1 are available, an algorithm for cosine similarity output to R, euclidean distance to G, and TS*SS to B are preferably run to provide the output. With the full redundancy in the output texture (diagonal mirroring) as previously described, it is possible to determine similarity of all documents in relation to a particular document according to the values found in a particular row or column. For example, the results of documents compared to document 2 can be found in row 2 or column 2.

FIG. 6B shows just such a horizontal row (yellow) or vertical column (green). All documents compared to document #25 fall along the yellow line. The document compared against document #25 will correspond to the pixel's column #within the row. Similarly, All documents compared to document #50 along under the green line. The specific document compared against document #50 is determined according to the row #.

Figure 7A:
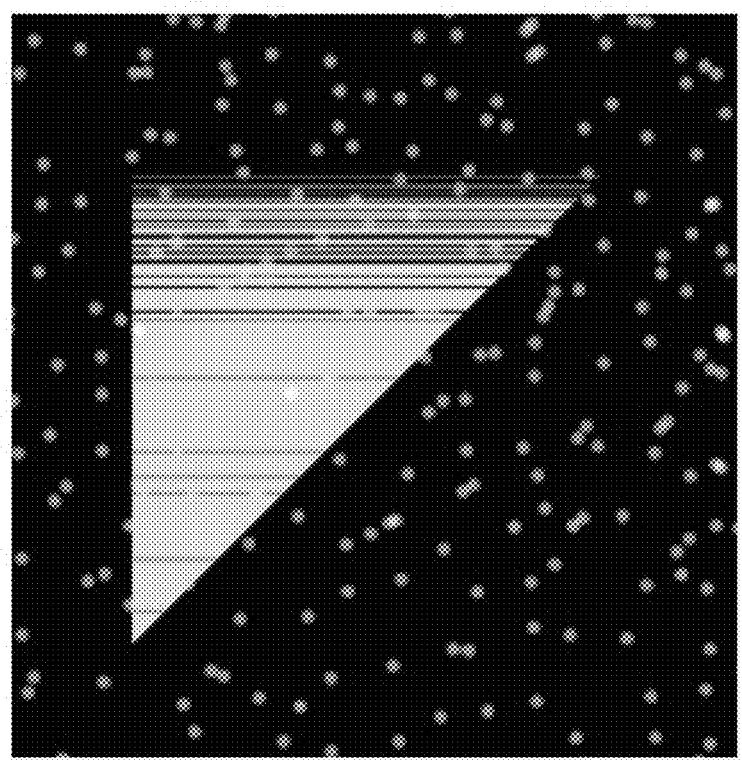
FIGS. 7A and 7B relate to non-limiting examples of the operation of the above described methods for collision detection.
Figure 7B:
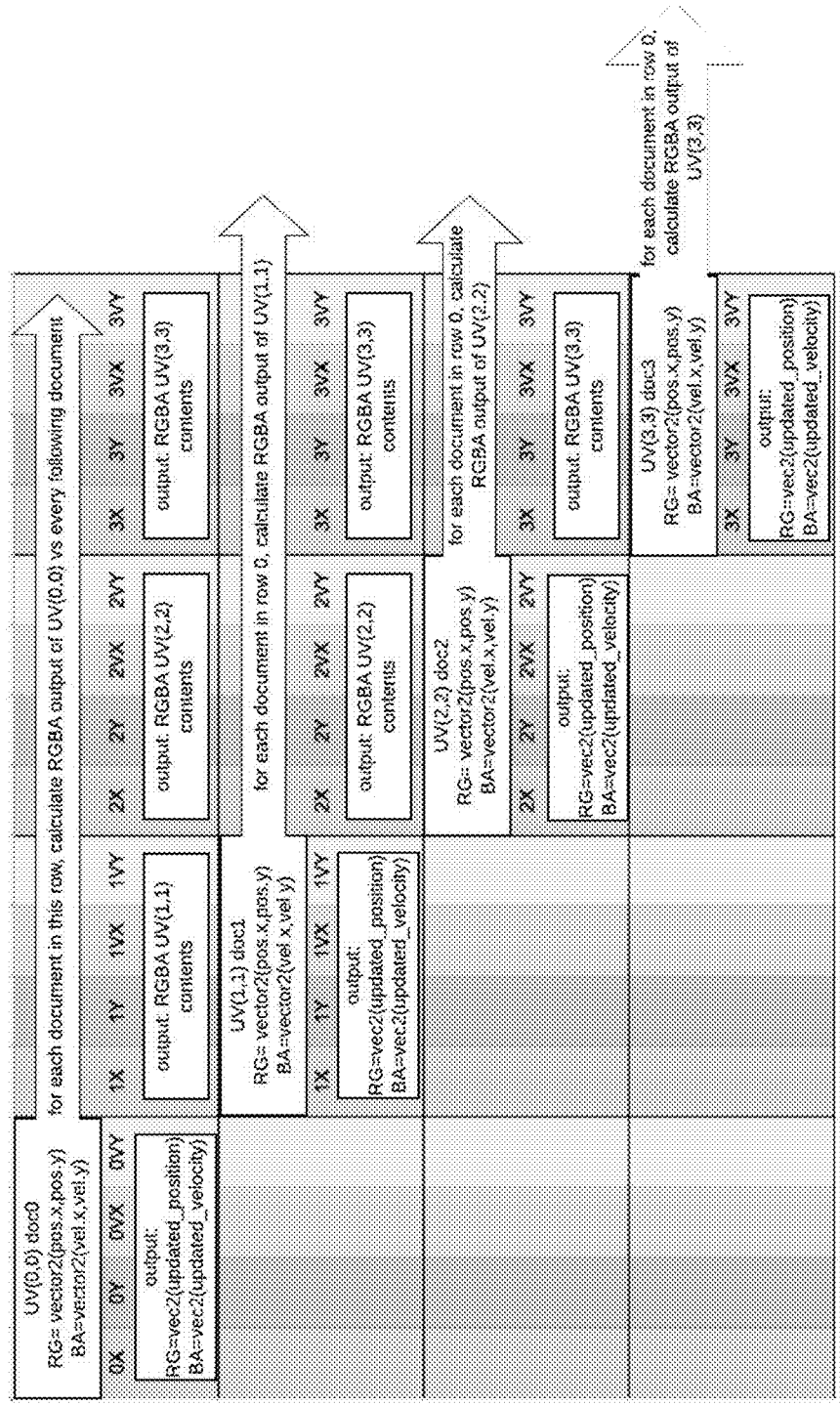

FIGS. 7A and 7B relate to non-limiting examples of the operation of the above described methods for collision detection. These figures also demonstrate that non-redundant textures may be used. The example above has 100% redundancy, which is fast and simple. However if it is necessary to pack more data into a texture, it is possible to use the diagonal half of the texture that is redundant to double the number of data points, such as documents, that can be processed in a single GPU render pass.

One such example of this is a complex GPU rendering computation like collision detection. Collision detection is very useful in visualizing network graphs of data. Each node in the graph would correspond to a document, and a connection between any two nodes could be parameterized to correspond to a data unit, ie: node1 retweets node2, node1 to nodeN all like node6's tweet, in the non-limiting example of interactions between unique authors on social media channels, here represented as nodes.

Collision detection is typically a very computationally intense algorithm to perform in the web browser on a CPU. In most modern CPU based libraries for the web, we can see up to 2000-4000 nodes in a graph before performance degrades. The modern CPU approach in the browser utilizes modern tools like quadtrees, verlet integration, and/or barnes-hut to efficiently calculate collision among a system of nodes at a fast rate.

Without wishing to be limited by a single hypothesis or a closed list, the exemplary method as described herein could be used to perform a direct (that is, non-heuristic) calculation of 2048 nodes against each other at a rendering speed often 7-10× faster than the modern CPU engines. Even adding a simple implementation such as quad trees would enable up to 128K points to be packed into a network graph on a modern browser's GPU.

FIG. 7A shows the results of collision detection mapped onto a triangle, while FIG. 7B shows the output data comparison. As shown with regard to FIG. 7B, the top row starts with comparison "document" 0 against every other document. By document, it is meant data point. The comparison is performed by comparing the position and velocity of document 0 (that is of data point 0) against each other data, to determine whether a collision has occurred. UV(0,0) represents doc0 (document 0); for each other data point, compare RG=vector2(pos.x,pos.y) and BA=vector2(vel.x, vel.y). The RGBA output of UV (0,0) is compared against every other data point in this manner. The output of the first row is RG=vec2(updated_position) and BA=vec2(updated_velocity). In the next row, the RGBA output of UV (1,1) is compared against every other data point, except that UV (1,1) does not need to be compared to UV (0,0), as that comparison was performed in the calculations for the previous row.

Figure 8A:
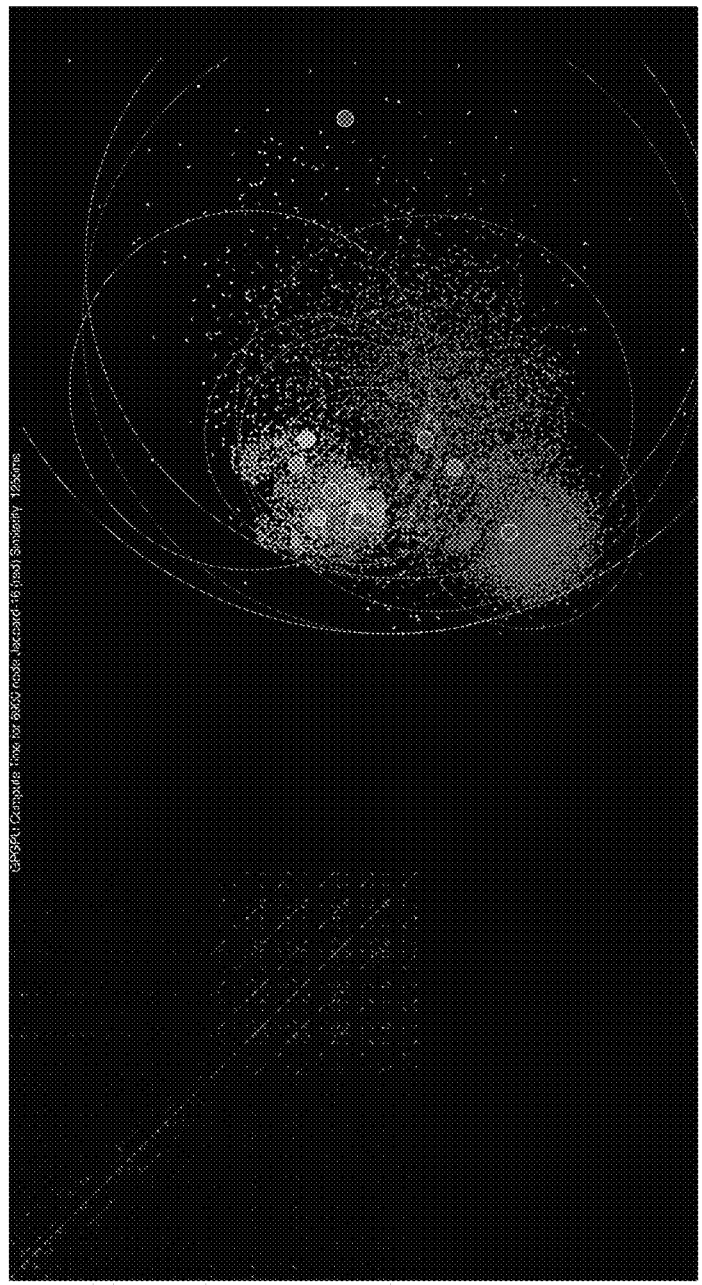
FIGS. 8A-8B relate to a non-limiting example of testing implementation of the Jaccard Index according to at least some embodiments of the present invention.
Figure 8B:
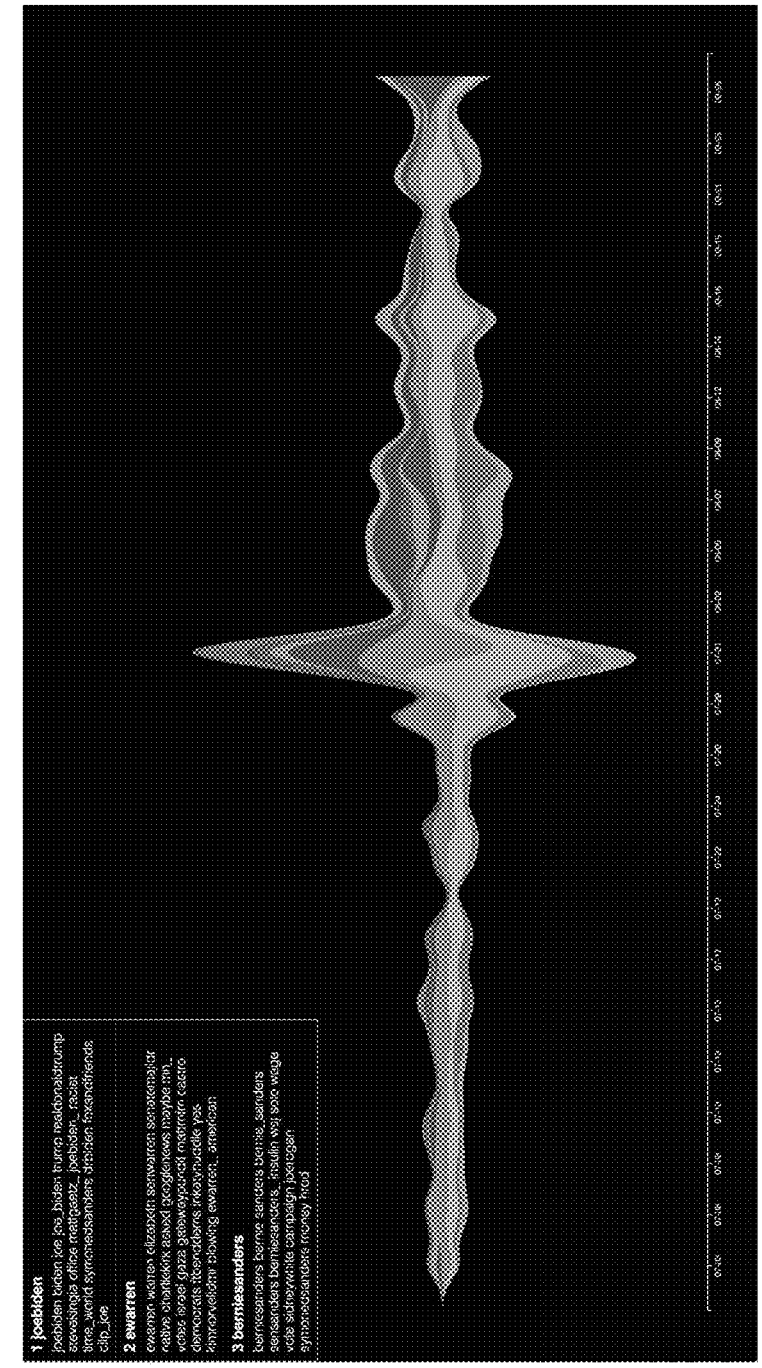

FIGS. 8A-8B relate to a non-limiting example of testing implementation of the Jaccard Index according to at least some embodiments of the present invention. Jaccard Similarity was performed on a group of thousands of topic vectors, each topic vector containing a list of 16 unique vectors, and each vector being a word within the topic. A topic in this non-limiting example is a unique fingerprint of a set of stories. For this example, each and every topic was compared to each other to determine similarity. This type of comparison can quickly become computationally difficult or even prohibitive. For example, on a dataset of 1000 topics, computationally the best case scenario would be n*(n+1)/2 (500,500 individual Jaccard comparisons), which is a triangular subset of the matrix of all comparisons. If all comparisons were performed, the result would be n*n (1,000,000 individual Jaccard comparisons).

For this test case, a list of all the unique topics within the broad queried dataset of stories surrounding eight of the democratic presidential candidates in summer 2019. The goal was to cluster all the topics within the entire group based on Jaccard similarity and see if Jaccard can re-group the dataset back into meaningful groups either based on candidate or shared topics among the entire group.

Each unique topic vector is a list of 20 vectors sorted in descending order of the probability of the vector being the topic. For the GPU, each word was cast as an integer, so the GPU received a list of 20 integers per topic. For this example, 10,000 topic vectors were benchmarked. Jaccard returns a value between 0 and 1 for every unique pair of topics (for this example, 100,000,000 Jaccard iterations, resulting in 50,005,000 unique pairs). The resulting matrix was then fed into two parallel processes.

The first parallel process related to community detection: Based on the 0:1 values between all the nodes in the graph, communities were detected based on clusters of strong relationships. This information was then used to assign colors to the rendered graph of the results. The second parallel process related to rendering a force directed graph in which each node is a unique topic, and the edges are Jaccard scores (0:1) whose weight is based on the value returned from Jaccard. The closer any two nodes are on such a graph, the more similar they are. The resultant graph showed a plurality of tight clusters of strong similarity between multiple documents.

The output of each cluster then feeds a stream graph, lists and other widgets. The clusters have all kinds of useful data within them such as how dense (or not) a cluster is, how many very similar documents it contains, etc. Each merged group of similar topics (the ones composing the strongest (most similar) clusters) was used to create a stream of stories that happened in this merged topic.

After similarity of all topics was determined, as a value from 0:1, a graph or other types of analysis or visualization can be performed. For example, the topics can be clustered by similarity and the clusters shown as a graph as described above. FIG. 8A shows a non-limiting example of such a graph. FIG. 8B shows a non-limiting example of a visualization based on cluster density data from the graph of FIG. 8A.

The above method was benchmarked by comparing implementation of the Jaccard Index as described above, according to at least some embodiments of the present invention, to a standard implementation using C and the OpenCL library, which was executed on a GPU. Properly tuned OpenCL and C is the lowest level interaction available to one of ordinary skill in the art with a GPU. Therefore, it should be the fastest method currently known in the art for performing such calculations. Another product which provides similar benchmarks is CUDA from Nvidia. CUDA uses pieces of OpenCL under the hood, is proprietary and is essentially a higher-level, more developer friendly product to do the same things as OpenCL. OpenCL offers more advanced tuning which is why it was selected to benchmark.

For 10K (10,000) nodes (topics), the Jaccard Index method, as implemented according to at least some embodiments of the present invention, had a speed of 2909 ms. By contrast, the method implemented according to C and OpenCL had a speed of only 7200 ms for the same data set.

Without wishing to be limited by a single hypothesis, the present invention, in at least some embodiments, features a method that is able to receive as input raw texture data received from the GPU, for example according to calculations performed according to WebGL or another such suitable platform. By contrast, the combination of C and OpenCL requires further processing of the raw texture data before the method can receive this data as input.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for executing a non-graphical algorithm by performing non-graphical algorithm calculations on a GPU (graphics processing unit), the system comprising a computational device, comprising a display, a mark-up language software for displaying mark-up language documents on said display and a GPU capable of rendering data for display on said display through executing texture mapping; wherein the mark-up language software comprises a web browser; wherein the non-graphical algorithm is adapted to be executed according to the texture mapping calculation functions of the GPU; wherein said non-graphical algorithm comprises a matrix calculation, wherein said execution of said non-graphical algorithm comprises execution of said matrix calculation through said web browser by said GPU; wherein a result of said execution of said matrix calculation is displayed through said web browser; and wherein the non-graphical algorithm relates to comparison of a plurality of data points, wherein each data point relates to a unit of information; wherein a result of execution of the non-graphical algorithm is displayed on said display through said mark-up language software; wherein said plurality of data points is arranged in a matrix, wherein each location in said matrix relates to a comparison of two data points, wherein said compute shader software performs said matrix calculation to compare said two data points; wherein the system further comprises a compute shader software, wherein said compute shader software is executed through said web browser and wherein said compute shader software performs said matrix calculation by execution by said GPU.

2. The system of claim 1, further comprising performing said matrix calculation for a triangular arrangement of said data points, such that each pair of data points is compared only once.

3. The system of claim 2, wherein said unit of information is a document and the non-graphical algorithm is a document comparison algorithm.

4. The system of claim 3, further comprising a document tokenization software for decomposing said document to a plurality of tokens and creating a vector of said tokens; wherein said performing said matrix calculation comprises comparing two vectors for comparing two documents.

5. The system of claim 4, wherein said comparing said two vectors comprises a geometric comparison method.

6. The system of claim 5, wherein said geometric comparison method is selected from the group consisting of Euclidean distance, LSI (Latent Semantic Indexing), t-SNE (T-distributed Stochastic Neighbor Embedding) and TS*SS.

7. The system of claim 5, wherein said geometric comparison method is selected from the group consisting of edit distance comparison methods, token based comparison methods and sequence based comparison methods.

8. The system of claim 7, wherein said edit distance comparison method is selected from the group consisting of Hamming Distance, Levenshtein Distance and Jaro-Winkler.

9. The system of claim 7, wherein said token based comparison method is selected from the group consisting of Jaccard index and Sorensen-Dice.

10. The system of claim 7, wherein said sequence based comparison method comprises Ratcliff-Obershelp.

11. The system of claim 2, wherein said unit of information relates to data measuring movements of a unit and the non-graphical algorithm is a collision detection algorithm.

12. The system of claim 2, wherein said unit of information relates to determination of interactions between two or more nodes on a graph.

13. The system of claim 12, wherein said nodes on said graph comprise a map of a plurality of interactions in a social media channel.

14. The system of claim 1, wherein said non-graphical algorithm is selected from the group consisting of Jaccard Similarity (Jaccard index), K-means, Cosine Similarity, Word2Vec, Smooth Inverse Frequency with Cosine Similarity, LSI (Latent Semantic Indexing) with Cosine Similarity, Latent Dirichlet Allocation (LDA) with Jensen-Shannon distance, Word Mover Distance, Variational Auto Encoder (VAE), Latent Dirichlet Allocation (LDA), Kullback-Leibler Divergence, Universal Sentence Encoder, GloVe (Global Vectors for Word Representation), InferSent, Google Sentence Encoder, Siamese LSTM (Long Short Term Memory), MaLSTM (Manhattan LSTM), WordNet, Translating Embeddings (TransE), and WuPalmer Words Similarity Algorithm.

15. The system of claim 1, wherein said computational device further comprises a memory for storing a defined native instruction set of codes; wherein said GPU is configured to perform a defined set of basic operations in response to receiving a corresponding basic instruction selected from said defined native instruction set of codes; said computational device comprising a first set of machine codes selected from the native instruction set for receiving said data, a second set of machine codes selected from the native instruction set for executing texture mapping and a third set of machine codes selected from the native instruction set for executing said non-graphical algorithm according to said texture mapping.

16. A method for executing a non-graphical algorithm by performing non-graphical algorithm calculations on a GPU (graphics processing unit), the method being performed on a system comprising a computational device, the computational device comprising a GPU capable of analyzing data through executing texture mapping and a memory for storing a plurality of instructions; wherein said plurality of instructions comprise instructions for adapting the non-graphical algorithm to be executed according to the texture mapping calculation functions of the GPU; the method comprising receiving data by the computational device; arranging the data into a plurality of vectors; and executing the non-graphical algorithm through the texture mapping calculation functions of the GPU according to said instructions stored in the memory, wherein said executing comprises comparing the plurality of vectors according to a geometric comparison method; wherein said computational device comprises a display; wherein the method further comprises displaying a result of executing the non-graphical algorithm on the GPU on said display; wherein said plurality of instructions further comprise instructions for executing functions of a mark-up language software, the method further comprising displaying said result of executing the non-graphical algorithm through said mark-up language software; wherein the mark-up language software comprises a web browser, wherein said non-graphical algorithm comprises a matrix calculation, wherein said executing said non-graphical algorithm comprises executing said matrix calculation through said web browser by said GPU; the method further comprising displaying a result of said execution of said matrix calculation through said web browser; wherein the computation device further comprises a compute shader software, the method further comprising executing said compute shader software through said web browser for performing said matrix calculation by execution by said GPU; and wherein the non-graphical algorithm relates to comparison of a plurality of data points, wherein each data point relates to a unit of information, and wherein said plurality of data points is arranged in said matrix, wherein each location in said matrix relates to a comparison of two data points, wherein said executing said compute shader software further comprises performing said matrix calculation to compare said two data points.

* * * * *